June 28, 1949.　　　　A. J. DEYRUP　　　　2,474,415
DIELECTRIC STRENGTH TEST FOR CAPACITORS
Filed Sept. 18, 1945
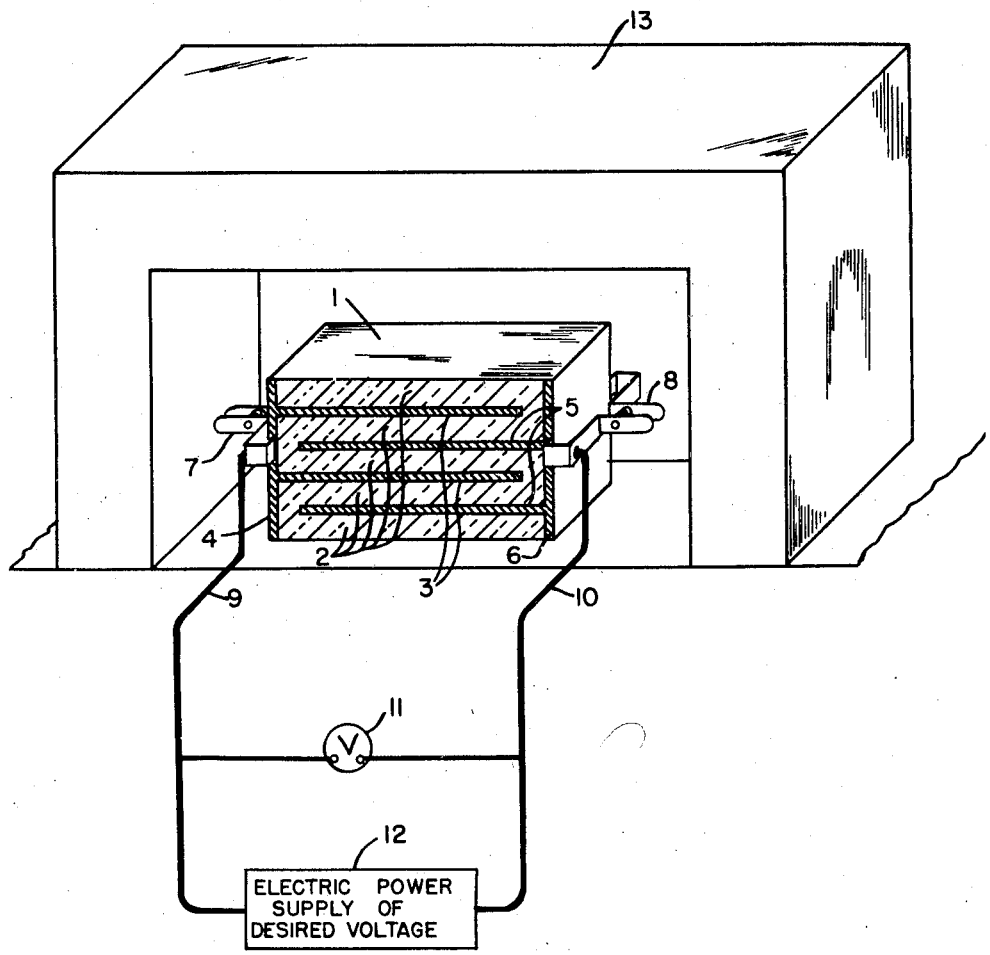
Alden J. Deyrup
INVENTOR.
BY
ATTORNEY.

Patented June 28, 1949

2,474,415

UNITED STATES PATENT OFFICE 2,474,415

DIELECTRIC STRENGTH TEST FOR CAPACITORS

Alden J. Deyrup, Westfield, N. J., assignor to E. I. du Pont de Nemours & Company, Wilmington, Del., a corporation of Delaware Application September 18, 1945, Serial No. 617,183

3 Claims. (Cl. 175—183)

This invention relates to a new and improved method for determining the dielectric strength of electrical capacitors constructed with ceramic materials. More particularly, it relates to a method whereby such dielectric strength of ceramic capacitors can be determined without objectionably damaging or destroying the capacitors.

Ceramic capacitors are commonly constructed by fusing ceramic materials about electrically conducting metal electrodes, alternate electrodes being connected with each other and being insulated from each other by the ceramic dielectric material. In one well-known method, layers of a vitreous dielectric paste and layers of a silver paste are alternately superimposed to build up a capacitor of the desired number of electrodes and the whole unit heated to fuse the dielectric material and coalesce the silver particles to form a monolithic structure. In the resulting structure, one alternate set of electrodes is completely embedded in the vitreous dielectric except at one end where the several electrodes are connected to each other, and the other alternate set of electrodes is embedded within the vitreous material except at the opposite end where the several electrodes are connected to each other. In another commonly employed method, capacitors constructed with vitreous dielectric material are made by applying a silver paste on chips composed of a vitreous material, stacking the chips with the silver paste therebetween and fusing the stack to form the capacitors with alternate sets of connected electrodes which are otherwise insulated from each other by the vitreous material. In still other methods, solid metallic electrodes are embedded in vitreous or other ceramic material by fusing the latter in place about the electrodes.

In all such methods of fabricating electrical capacitors, great care must be taken to prevent flaws such as pinholes, bubbles and cracks in the ceramic material or inaccurate registration of electrodes. Such flaws are not readily detected and may not be found until the capacitors have been installed in an electrical circuit and put in service.

It has been common practice, heretofore, to check on the quality of capacitors in production by subjecting a percentage of them to a life test at a voltage in excess of that for which they are designed to operate. A former specification test, American War Standard, fixed mica-dielectric capacitors, is representative of such a life test. Capacitors (say 500 volts rated working voltage) are placed on double the working voltage (1000 volts life test voltage) for 1000 hours. If not more than one unit out of twelve fails, the group passes life test specification as a whole. If two or more units fail, the group fails as a whole. The life test, by reason of the higher voltage applied, is a reasonably safe forecast of the satisfactory service life of the capacitors over a much longer period at the actual working voltage. Thus, the life test is the criterion of the permanence of the capacitor. This is of the utmost importance, because dielectric breakdown of any capacitor in a radio circuit almost always causes not merely loss of efficiency but total inoperability of the circuit, frequently also causing serious damage to other components of the circuit. The circuit becomes useless then until a competent expert locates and replaces the defective capacitor, and possibly other components incidentally damaged. Such life tests are, however, unsatisfactory to the extent that only a small percentage of production can be so tested without reaching completely impractical size and cost of test equipment.

It has also been common practice to flash test capacitors at two or more times the voltage that the capacitor is designed to carry. It might be thought that the permanence on specification life test might be assured by testing the capacitors at a sufficiently high test voltage for a practically short period such as a few seconds. This is not the case, however. For example, vitreous dielectric capacitors which initially pass test at 2100 volts D. C. for 5 seconds at room temperature may fail within 100 hours at 1000 volts D. C. It would seem that there must be some test voltage high enough to knock out the weak capacitors and leave only those which would pass the life test. However, capacitors designed to carry 500 volts, when subjected to as high as 4000 volts D. C. for a period of about five seconds at room temperature, failed to pass a subsequent life test at 1000 volts to the extent of the required eleven out of twelve. On the other hand, these high voltages damage or destroy a very large proportion of capacitors which would otherwise survive a life test. The following example shows this to be the case.

A group of similar vitreous ceramic capacitors designed for operation at a voltage of 500 were divided in half; one-half was placed on a life test at 1000 volts for 100 hours directly without any flash test. Of these, 60% broke down and 40% remained during the course of the test. This group, of course, constitutes a failure as a whole. The other half was first flash-tested at 3500 volts D. C. for 20 seconds. This flash test knocked out 60%. The remainder were placed on life test at 1000 volts for 100 hours. Of the total placed on life test, 88% failed and 12% remained. It was concluded from experiments such as these that a high voltage, short-time test would knock out vitreous dielectric capacitors that could have passed life test, but would fail to break down others that will fail on life test.

It might theoretically be possible to make vitreous dielectric capacitors so free of flaws that a negligible fraction would fail on life test. This is actually quite practical if low capacities are desired, such as 10 to 200 micromicrofarads. When, however, it is desired to make larger capacities, such as 500 to 3000 micromicrofarads, within the customary, practical dimensional limits, it is not feasible to make capacitors so free of flaws that they will surely pass specification life test. In a capacitor built of three separate units, if one fails the whole fails. Twelve capacitors of this type contain thirty-six units, so it is apparent that not more than about 3% are permitted to fail in specification life test. Yields of 50% to 100% are usually obtained of units that individually withstand 1000-hour life test. It is evident, however, that none of these are any good unless either the yield consistently exceeds 97% or unless a test is available to remove those units which would not pass life test.

It is an object of this invention to provide a satisfactory test for electrical capacitors constructed with ceramic dielectric material.

It is another object to provide a test for ceramic electrical capacitors that will eliminate defective capacitors without objectionably affecting those which would pass a satisfactory life test.

It is still another object of this invention to provide a method for rejecting ceramic electrical capacitors which would be unsatisfactory in service without objectionably affecting those which would be satisfactory in service.

Other objects of the invention will appear hereinafter.

The objects of the invention may be accomplished, in general, by heating a ceramic electrical capacitor, uniformly, to a temperature of between 100° C. and 300° C., and subjecting the same, for a period of between one and ten seconds, to an electric power supply having a voltage between 1.6 and 5.0 times the voltage that said capacitor is designed to carry.

The accompanying drawing illustrates, diagrammatically, apparatus suitable for use in carrying out the test of the present invention.

In the drawing, reference numeral 1 designates an electrical capacitor comprising five dielectric layers 2, two alternately disposed electrodes 3 connected at the left-hand side by conducting element 4, and two alternately disposed electrodes 5 connected at the right-hand side by conducting element 6. Clamps 7 and 8, connected respectively to opposite lead wires 9 and 10 of an electric power supply 12 of the desired voltage, are clamped respectively to conducting elements 4 and 6. The capacitor 1 is positioned within an oven 13 in which it is heated to a given uniform temperature between 100° C. and 300° C.

The test for determination of dielectric strength of capacitors in accordance with the present invention has particular utility in testing capacitors constructed with vitreous dielectric material. The test may, however, be used in testing capacitors constructed with other ceramic materials such as clays and other refractory materials.

The ceramic electrical capacitor may be heated in any desired manner which will ensure its having a substantially uniform temperature of 100° C. to 300° C., and preferably between 180° C. and 240° C., throughout. For example, it may be heated in an oven, by means of an electrical resistance or inductance, by means of infra-red lamps or the like. The leads to the capacitor must be well connected for the period of the test. It is advantageous to apply this test to a capacitor unit before leads are connected thereto by soldering since the test temperature usually employed will be near or above the melting point of solder. After the heat-test has been completed it is preferred that the capacitors be cooled slowly to room temperature to prevent thermal shock.

The electric test power supply may be either alternating current or direct current. For purposes of the test, one volt direct current is equivalent to one volt alternating current (peak alternating current) (one volt peak alternating current = 0.7 volt root mean square alternating current). Generally, alternating current is preferred because it has less electrolytic effect, which may under some circumstances be disadvantageous.

The test period may be between one and ten seconds. However, once the desired test period is established for the testing of a given capacitor, it is preferred that this period be maintained for all such capacitors within plus or minus 10%.

The optimum time, temperature and voltage employed in testing capacitors constructed with ceramic dielectric compositions may vary within the above-mentioned limits for different dielectric compositions.

For any vitreous dielectric composition, suitable temperature and test voltage can be determined in the following manner which is empirical but straightforward.

Take a large group of capacitor units and mix them thoroughly. Then divide into sub-groups, securing thereby equivalent lots of similar properties. Test these sub-groups, in accordance with the present invention, at various times, voltages and temperatures within the above-described limits, discarding those broken down in test. The dielectric breakdown in this test is recognized as in any dielectric test as, for example by sudden drop in voltage indicated by a voltmeter across the capacitor unit, or suitable current relays may be used to indicate breakdown or to operate automatic reject mechanisms. Subsequently place those that have not broken down to a life test. Select as optimum test condition that which passes the specification life test. If more than one group pass the life test, select the test condition which gave the greatest yield.

In general, the voltage may be reduced within the limits specified (0.8 to 2.5 times the life test voltage to be met, or 1.6 to 5.0 times the voltage that the capacitor is designed to carry) as the temperature of test is raised within the limits, 100° C. to 300° C. The time of test may be raised, within the limits of one to ten seconds, as the temperature or the voltage is lowered.

The following example gives in detail a preferred method for the testing of a capacitor constructed with a given vitreous dielectric, it being understood that the details are illustrative and not necessarily limitative of the invention.

*Example*

Four hundred and twenty-five (425) capacitor units were obtained from 18 different production lots in which these units were designed to carry a 500-volt current, the capacitor units being constructed with a vitreous dielectric having the following composition:

| | Per cent |
|---|---|
| Lead oxide (PbO) | 53.2 |
| Silicon dioxide (SiO$_2$) | 27.1 |
| Potassium oxide (K$_2$O) | 2.6 |
| Sodium oxide (Na$_2$O) | 1.6 |
| Lithium oxide (Li$_2$O) | 0.7 |
| Sodium fluoride (NaF) | 4.5 |
| Magnesium oxide (MgO) | 3.6 |
| Strontium oxide (SrO) | 6.7 |

None of the production lots from which these capacitors were taken would meet the specification life test of about 3% failure in 1000 hours test at 1000 volts D. C. which was required of these units which were designed to be assembled into capacitors each comprising three units. A preliminary test on these production lots had shown that an average of 33% would suffer dielectric breakdown in 1000 hours at 1000 volts D. C.

The 425 capacitor units were heated to a uniform temperature of 200° C. in an oven and tested individually at that temperature by applying 1200 volts A. C. (RMS) for six seconds. This test broke down 184 and passed 241 or 57% of the total. The 241 units which were tested by the process were then placed on life test for 1000 hours at 1000 volts D. C. Only 2 units, or 0.8% of the total life-tested, failed during life test. It is seen that the test process of the present invention permitted safe rejection of those which would not pass life test, within specification tolerance, without excessive rejection of units that would pass. Furthermore, the units which pass the heat-voltage test of the present invention are not damaged to any noticeable extent.

In testing capacitors constructed with the particular vitreous dielectric of the above example, the temperature is preferably maintained between 180° C. and 240° C. since at temperatures higher than 240° C. objectionable resistance heating will take place and at temperatures lower than 180° C. some capacitor units which will not pass the life test will survive.

The test for determination of the strength of ceramic capacitors of the present invention is considered to be effective when carried out for the period of time and the voltage above specified at any elevated temperature at which the product of the resistance, in megohms, and the capacitance, in micromicrofarads, of the dielectric lies between 500 and 50,000. For example, the resistivity of the dielectric composition of the above example has been measured and found to be approximately defined by the equation:

$$\log_{10} RC = 10.5 - .032\ T$$

where
R = resistance in megohms,
C = capacitance in micromicrofarads, and
T = temperature in degrees centigrade The temperature range corresponding to the 500 to 50,000 megohm micromicrofarad product above referred to for the above-said dielectric composition is approximately 180° C. to 240° C.

Throughout the specification and claims, any reference to parts, proportions or percentages refer to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The method of testing the sufficiency of dielectric strength of an electrical capacitor constructed with ceramic dielectric material which comprises heating the capacitor to a uniform temperature between 100° C. and 300° C., and applying to said heated capacitor, for a period of one to ten seconds, an electric current having a voltage between 1.6 and 5.0 times the voltage which said capacitor is designed to carry and measuring the voltage across the capacitor during said period to detect electric breakdown of the dielectric material.

2. The method of testing the sufficiency of dielectric strength of an electrical capacitor constructed with ceramic dielectric material which comprises heating the capacitor to a uniform temperature between 180° C. and 240° C., and applying to said heated capacitor, for a period of one to ten seconds, an electric current having a voltage between 1.6 and 5.0 times the voltage which said capacitor is designed to carry and measuring the voltage across the capacitor during said period to detect electric breakdown of the dielectric material.

3. The method of testing the sufficiency of dielectric strength of an electrical capacitor constructed with ceramic dielectric material which comprises applying to said capacitor, for a period of one to ten seconds, an electric current having a voltage between 1.6 and 5.0 times the voltage which said capacitor is designed to carry while maintaining the capacitor at a temperature at which the product of the resistance, in megohms, and the capacitance, in micromicrofarads, will be between 500 and 50,000 and measuring the voltage across the capacitor during said period to detect electric breakdown of the dielectric material.

ALDEN J. DEYRUP.

REFERENCES CITED

The following references are of record in the file of this patent:

UNITED STATES PATENTS

| Number | Name | Date |
|---|---|---|
| 1,555,249 | Pickard | Sept. 20, 1925 |
| 1,853,639 | Robinson | Apr. 12, 1932 |
| 1,944,211 | Brodie | Jan. 23, 1934 |
| 2,058,846 | Waterman | Oct. 27, 1936 |

OTHER REFERENCES

Coursey, Electrical Condensers, Issac Pitman & Sons, 1927, pages 101–104.

Electronic Engineering, May 1944, pages 505–507.

Electrical Review, June 23, 1944, pages 870–874.

Monkhouse, Electrical Insulating Materials, Issac Pitman and Sons, London, 1926, pages 330–335.